US012474668B2

(12) United States Patent
Sugiura et al.

(10) Patent No.: US 12,474,668 B2
(45) Date of Patent: Nov. 18, 2025

(54) IMAGE-FORMING APPARATUS INCLUDING PROCESS CARTRIDGE AND DEVICE-SIDE TERMINAL CONFIGURED TO CONTACT PROCESS-SIDE TERMINAL

(71) Applicant: BROTHER KOGYO KABUSHIKI KAISHA, Nagoya (JP)

(72) Inventors: Shinta Sugiura, Nagoya (JP); Shunsuke Aiba, Toyoake (JP); Keita Inoue, Konan (JP); Kentaro Aoyama, Nagoya (JP); Toshinori Araki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/476,906

(22) Filed: Sep. 28, 2023

(65) Prior Publication Data

US 2024/0027955 A1 Jan. 25, 2024

Related U.S. Application Data

(63) Continuation of application No. PCT/JP2022/014333, filed on Mar. 25, 2022.

(30) Foreign Application Priority Data

Mar. 31, 2021 (JP) ................................ 2021-059995

(51) Int. Cl.
*G03G 21/18* (2006.01)
*G03G 15/00* (2006.01)
(Continued)

(52) U.S. Cl.
CPC ..... *G03G 21/1839* (2013.01); *G03G 15/1605* (2013.01); *G03G 15/751* (2013.01);
(Continued)

(58) Field of Classification Search
CPC ........... G03G 15/0863; G03G 21/1652; G03G 21/1647; G03G 15/0865; G03G 21/1676
See application file for complete search history.

(56) References Cited

U.S. PATENT DOCUMENTS 6,389,250 B1 5/2002 Numagami et al.
10,775,737 B1 9/2020 Leemhuis et al.
(Continued)

FOREIGN PATENT DOCUMENTS

JP 9-152757 A 6/1997
JP 11-242371 A 8/1999
(Continued)

OTHER PUBLICATIONS

International Preliminary Report on Patentability issued in PCT/JP2022/014333, Oct. 3, 2023.
(Continued)

*Primary Examiner* — Jessica L Eley
(74) *Attorney, Agent, or Firm* — Merchant & Gould P.C.

(57) ABSTRACT

An image-forming apparatus includes: a main casing; a drawer movable in a first direction between a first position inside the main casing and a second position outside the main casing; process cartridges attachable to and detachable from the drawer; a controller; and a device-side terminal connected to the controller. The process cartridges are arranged in the first direction in an attached state to the drawer. Each process cartridge includes a photosensitive drum, a magnetic roller, a developing container for storing carrier, a conveying member, a toner sensor, a process memory, and a process-side terminal. The toner sensor is configured to output a detection signal corresponding to a concentration of toner in the developing container. The process-side terminal is for both outputting the detection signal of the toner sensor and outputting information about the process cartridge stored in the process memory. The
(Continued)

device-side terminal is configured to contact the process-side terminal.

16 Claims, 12 Drawing Sheets

(51) Int. Cl.

| | |
|---|---|
| ***G03G 15/16*** | (2006.01) |
| ***G03G 21/00*** | (2006.01) |
| ***G03G 21/16*** | (2006.01) |

(52) U.S. Cl.

CPC ......... *G03G 15/80* (2013.01); *G03G 21/0011* (2013.01); *G03G 21/1633* (2013.01); *G03G 2215/0097* (2013.01); *G03G 2215/0888* (2013.01); *G03G 2221/183* (2013.01)

(56) References Cited

U.S. PATENT DOCUMENTS

| | | | |
|---|---|---|---|
| 2001/0014225 A1 | 8/2001 | Otsubo et al. | |
| 2002/0085854 A1 | 7/2002 | Numagami et al. | |
| 2007/0286617 A1 | 12/2007 | Tanaka et al. | |
| 2008/0159774 A1 | 7/2008 | Tanabe et al. | |
| 2012/0200871 A1* | 8/2012 | Takahashi | B41J 2/17546 358/1.9 |
| 2013/0084096 A1 | 4/2013 | Hashimoto | |
| 2014/0147158 A1 | 5/2014 | Fujinaka et al. | |
| 2018/0052423 A1* | 2/2018 | Hwang | G03G 21/1867 |
| 2018/0335752 A1* | 11/2018 | Saeki | G03G 21/1814 |

FOREIGN PATENT DOCUMENTS

| | | |
|---|---|---|
| JP | 2001-066871 A | 3/2001 |
| JP | 2002-244382 A | 8/2002 |
| JP | 2007-333876 A | 12/2007 |
| JP | 2010-217729 A | 9/2010 |
| JP | 2012-103560 A | 5/2012 |
| JP | 2012-212188 A | 11/2012 |
| JP | 2013-076877 A | 4/2013 |
| JP | 2014-106393 A | 6/2014 |
| JP | 2015-055704 A | 3/2015 |
| JP | 2015-064517 A | 4/2015 |

OTHER PUBLICATIONS

International Search Report in related international application PCT/JP2022/014333 , May 17, 2022.

* cited by examiner

IMAGE-FORMING APPARATUS INCLUDING PROCESS CARTRIDGE AND DEVICE-SIDE TERMINAL CONFIGURED TO CONTACT PROCESS-SIDE TERMINAL

REFERENCE TO RELATED APPLICATIONS

This is a by-pass continuation application of International Application No. PCT/JP2022/014333 filed Mar. 25, 2022 claiming priority from Japanese Patent Application No. 2021-059995 filed Mar. 31, 2021. The entire contents of the International Application and the priority application are incorporated herein by reference.

BACKGROUND ART

There has been known a conventional image-forming apparatus including a device body, process cartridges, and a drawer that can be pulled out of the device body. The process cartridges are detachably attached to the drawer. The process cartridges store only non-magnetic toner.

DESCRIPTION

However, there is a demand for an image-forming apparatus that includes a drawer as in the conventional image-forming apparatus and uses a two-component developer containing toner and carrier. An image-forming apparatus that uses two-component developer needs to maintain the toner at a uniform concentration within a developing container that holds the toner and carrier. Therefore, the process cartridge preferably has a toner sensor that can detect the concentration of toner in the developing container and can output a detection signal from this detection to a controller of the image-forming apparatus. It is also preferable that the process cartridge has a process memory that stores information about that process cartridge and can output this information to the controller of the image-forming apparatus.

In view of the foregoing, it is an object of the present disclosure to provide an image-forming apparatus in which a detection signal of a toner sensor and information stored in a process memory that are outputted from a process cartridge attachable to and detachable from a drawer can be outputted to a controller.

In order to attain the above and other objects, according to one aspect, the present disclosure provides an image-forming apparatus including a main casing, a drawer, a plurality of process cartridges, a controller, and a device-side terminal. The drawer is movable in a first direction between a first position inside the main casing and a second position outside the main casing. The plurality of process cartridges is attachable to and detachable from the drawer. The process cartridges are arranged in the first direction in a state where the process cartridges are attached to the drawer. Each of the process cartridges includes a photosensitive drum, a magnetic roller, a developing container, a conveying member, a toner sensor, a process memory, and a process-side terminal. The magnetic roller is configured to supply toner to the photosensitive drum. The developing container is for storing therein carrier. The conveying member is positioned inside the developing container. The conveying member is configured to convey toner and carrier toward the magnetic roller. The toner sensor is configured to output a detection signal corresponding to a concentration of toner in the developing container. The process memory is for storing information about the process cartridge. The process-side terminal for both outputting the detection signal of the toner sensor and outputting the information stored in the process memory. The device-side terminal is positioned inside the main casing. The device-side terminal is connected to the controller. The device-side terminal is configured to contact the process-side terminal.

Next, a first embodiment of the present disclosure will be described in detail while referencing the drawings as appropriate.

Figure 1:
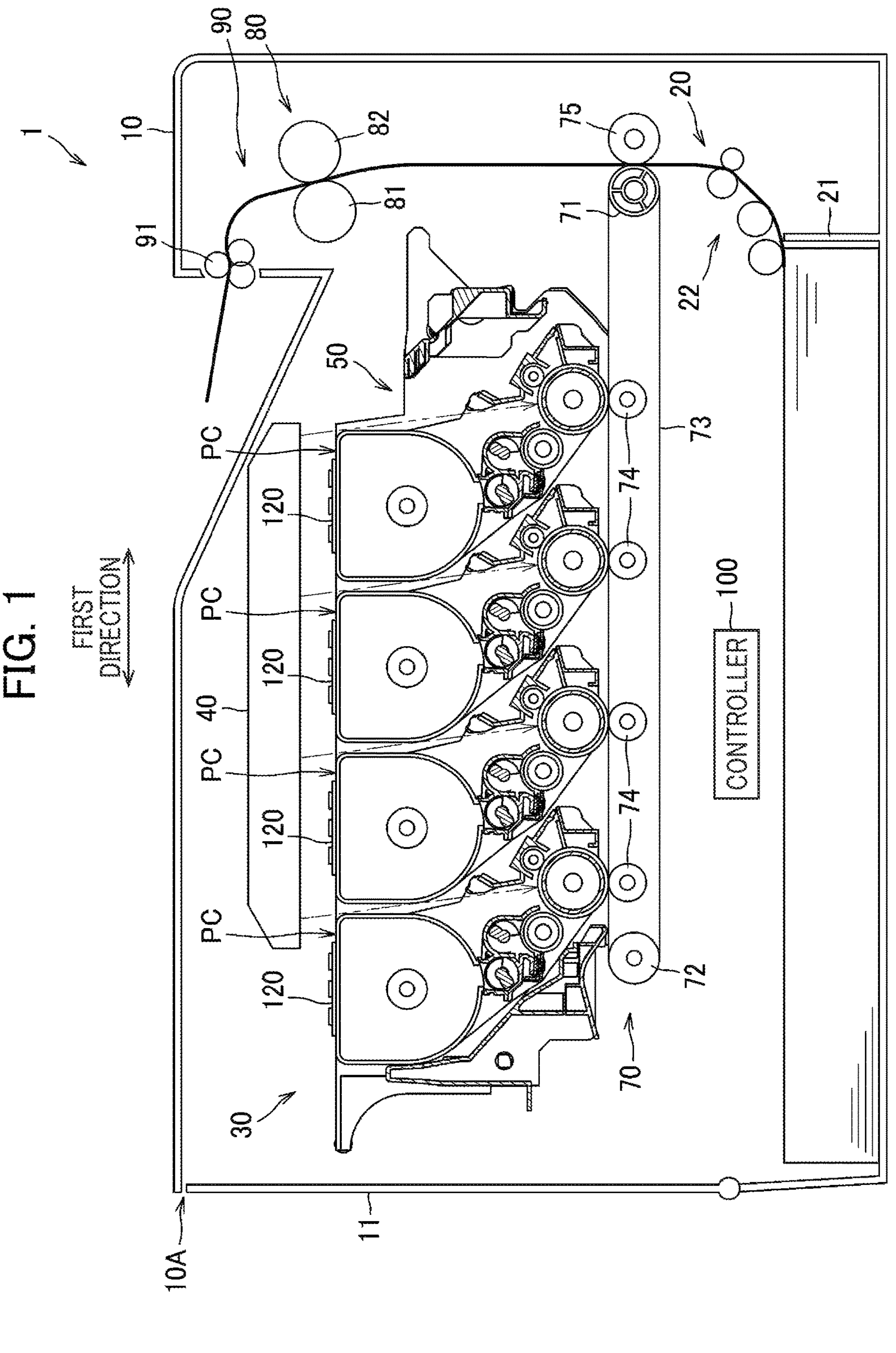
FIG. 1 is a cross-sectional view of a color printer.

As shown in FIG. 1, a color printer 1 serving as an example of the image-forming apparatus includes a main casing 10, a sheet-feeding section 20, an image-forming section 30, a discharging section 90, and a controller 100.

The main casing 10 has an opening 10A, and a cover 11. The cover 11 is movable between an open position (see FIG. 2A) where the cover 11 opens the opening 10A, and a closed position (see FIG. 2B) where the cover 11 closes the opening 10A. Specifically, the cover 11 is pivotally movable between the open position and the closed position.

The sheet-feeding section 20 includes a feeding tray 21, and a sheet-conveying mechanism 22. The feeding tray 21 accommodates sheets S. The sheet-conveying mechanism 22 is configured to convey the sheets S from the feeding tray 21 to the image-forming section 30.

The image-forming section 30 includes a scanning unit 40, a drawer 50, a belt unit 70, and a fixing device 80.

While not shown in the drawings, the scanning unit 40 includes a laser emitting unit, a polygon mirror, lenses, reflecting mirrors, and the like. The scanning unit 40 emits laser beams onto photosensitive drums 51.

Figure 2A:
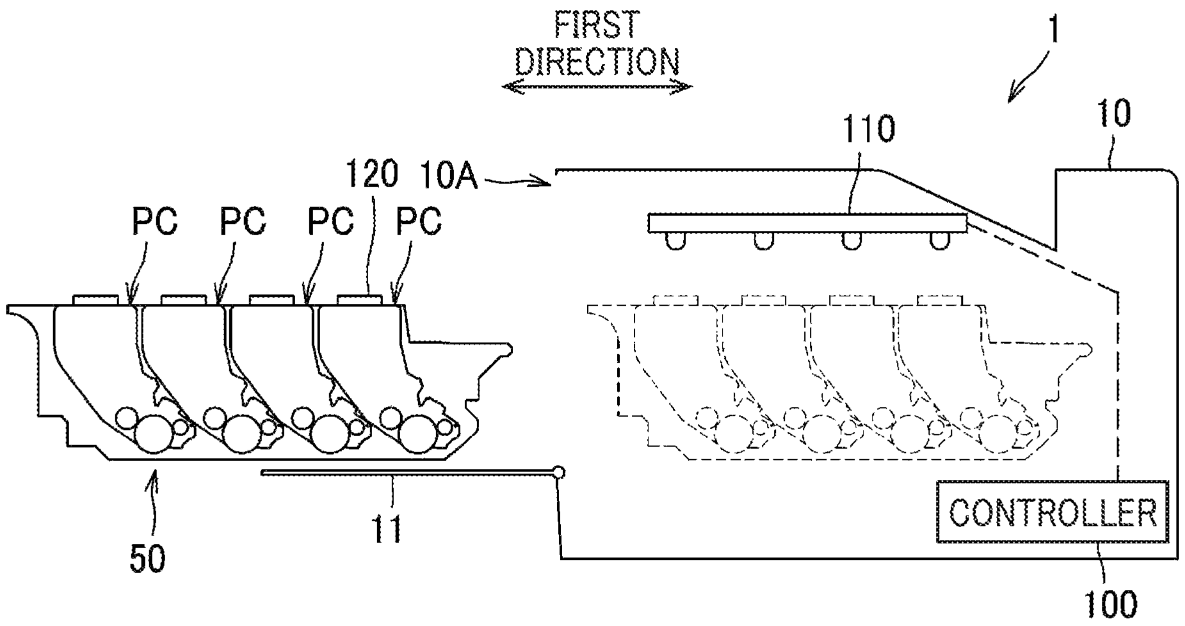
FIG. 2A is an explanatory view for explaining the positions of device-side terminals when a cover is in an open position.

As shown in FIG. 2A, the drawer 50 is movable through the opening 10A in a first direction relative to the main casing 10. The drawer 50 is movable in the first direction through the opening 10A between a first position inside the main casing 10 and a second position outside the main casing 10.

Figure 3:
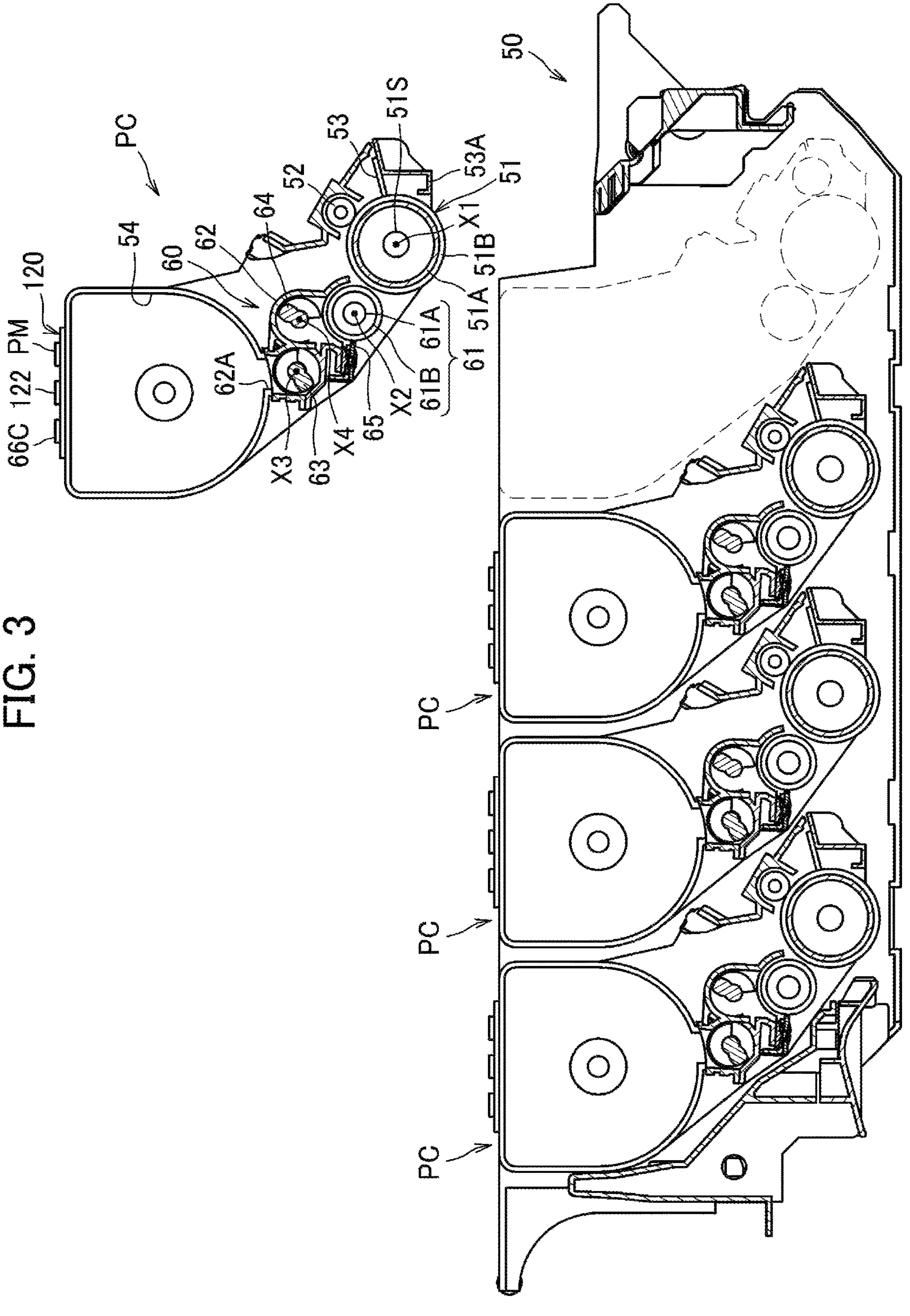
FIG. 3 is a cross-sectional view of a drawer having process cartridges attached thereto.

As shown in FIG. 3, a plurality of process cartridges PC is attachable to and detachable from the drawer 50. In the present embodiment, four process cartridges PC are attachable to and detachable from the drawer 50. In a state where the process cartridges PC are attached to the drawer 50, the process cartridges PC are arranged in the first direction, i.e., in the direction in which the drawer 50 is pulled out of the main casing 10.

Each process cartridge PC includes the photosensitive drum 51, a charging roller 52, a cleaning blade 53, a waste toner box 53A, a toner-accommodating section 54, a process board 120, and a developing unit 60. The four photosensitive drums 51 are arranged in the first direction in a state where the four process cartridges PC are attached to the drawer 50. The photosensitive drum 51 is rotatable about a first axis X1 extending in a second direction that crosses the first direction. In the present embodiment, the second direction is orthogonal to the first direction.

The photosensitive drum 51 includes a base tube 51A, a photosensitive layer 51B formed on the outer circumferential surface of the base tube 51A, and a shaft 51S. The shaft 51S and base tube 51A are each made of an electrically conductive member such as a metal member. The base tube 51A is electrically connected to the shaft 51S. As will be described later, the base tube 51A is grounded through a ring spring B2, a sheet metal frame B1, and a device-side ground terminal EB. In the present embodiment, the photosensitive layer 51B is formed of a plurality of layers overlaid on the base tube 51A, with each layer having a separate function. However, the photosensitive layer 51B may be formed of only a single layer that possesses a plurality of functions.

Each process cartridge PC is attachable to and detachable from the drawer 50 in a direction orthogonal to the second direction. In the present embodiment, each process cartridge PC can be detached upward from the drawer 50.

The charging roller 52 is a roller configured to charge the surface of the photosensitive drum 51. Note that a scorotron charger may be used in place of the charging roller 52 for charging the surface of the photosensitive drum 51.

The cleaning blade 53 contacts the photosensitive drum 51 to clean the surface of the photosensitive drum 51. The waste toner box 53A is positioned below the cleaning blade 53. Waste toner cleaned off by the cleaning blade 53 is stored in the waste toner box 53A. Note that a cleaning roller may be used in place of the cleaning blade 53 to clean the surface of the photosensitive drum 51.

The toner-accommodating section 54 accommodates non-magnetic toner. In the present embodiment, the four toner-accommodating sections 54 accommodate toner in the colors yellow (Y), magenta (M), cyan (C), and black (K).

The process board 120 is positioned at the outer surface of the process cartridge PC. In the present embodiment, the process board 120 is positioned on the top surface of the process cartridge PC in a state where the process cartridge PC is attached to the drawer 50. The process board 120 includes a sensor connector 66C, a process memory PM, and a process-side terminal 122.

The sensor connector 66C is a connector that is connected to a toner sensor 66 described later.

The process memory PM can store information about the process cartridge PC. Specifically, the process memory PM stores process cartridge information related to the process cartridge PC. The process cartridge information is at least one of identification information that can uniquely identify the process cartridge PC, and life information for the process cartridge PC. The identification information is a serial number, for example. The life information is at least one of a cumulative number of rotations of the photosensitive drum 51, a cumulative number of rotations of a magnetic roller 61, a cumulative number of rotations of a first auger 63, a used dot count, and a residual quantity of toner. Note that in the present disclosure includes the phrase "at least one of A, B, and C" as an alternative expression that means one or more of A, B and C. In other words, the phrase "at least one of A, B, and C" in the present disclosure means "(A), (B), (C), (A and B), (A and C), (B and C) or (A, B and C)".

The process-side terminal 122 is a terminal for outputting information about the process cartridge PC. Specifically, when the process cartridge PC is positioned inside the main casing 10, the process-side terminal 122 can output a detection signal (i.e., a measurement signal) of the toner sensor 66 described later and information stored in the process memory PM.

The process-side terminal 122 is also a terminal for inputting information transmitted from the controller 100 to the process memory PM. Specifically, through the process-side terminal 122, usage information received from the controller 100 after a printing operation of the color printer 1 can be inputted to the process memory PM. The usage information is information relative to usage of the process cartridge PC, such as the number of printed sheets, the dot count, or the quantity of consumed toner.

The developing unit 60 includes the magnetic roller 61, a developing container 62, the first auger 63, a second auger 64, and a thickness-regulating blade 65. The first auger 63 is an example of the conveying member.

The magnetic roller 61 is a roller configured to supply toner onto the photosensitive drum 51. The magnetic roller 61 includes a magnetic shaft member 61A, and a sleeve 61B. The magnetic shaft member 61A has different magnetic poles arranged in a predetermined pattern along the circumferential direction. For example, the magnetic shaft member 61A is a columnar member in which a plurality of permanent magnets is embedded. The magnetic shaft member 61A is fixed to the developing container 62.

The sleeve 61B is configured of a cylindrical member formed primarily of non-magnetic metal material, for example. The sleeve 61B is rotatable about the magnetic shaft member 61A. Carrier is held on the sleeve 61B by the magnetic force of the magnetic shaft member 61A. The toner and carrier are tribocharged when agitated in the developing container 62, and toner is electrostatically held on the magnetic roller 61 by the carrier.

The magnetic roller 61 is positioned between the toner-accommodating section 54 and the photosensitive drum 51. The sleeve 61B is rotatable about a second axis X2 extending in the second direction. In other words, the magnetic roller 61 is rotatable about the second axis X2 extending in the second direction. The magnetic roller 61 faces the surface of the photosensitive drum 51. The magnetic roller 61 is separate from the surface of the photosensitive drum 51.

The developing container 62 is a container for storing carrier that is a magnetic material. The carrier is iron powder, for example. The developing container 62 has a supply port 62A. The supply port 62A allows the developing container 62 to be replenished with toner from the toner-accommodating section 54. The supply port 62A is positioned at the opposite side of the first auger 63 and second auger 64 from the magnetic roller 61. In other words, the supply port 62A is positioned at the opposite side of the first auger 63 from the magnetic roller 61 and is also positioned at the opposite side of the second auger 64 from the magnetic roller 61.

The supply port 62A is positioned upper than the first auger 63 and second auger 64. Specifically, the supply port 62A is positioned above the first auger 63. The second axis X2 is positioned lower than the first auger 63 and second auger 64. Specifically, the second axis X2 is positioned below the second auger 64.

Figure 4A:
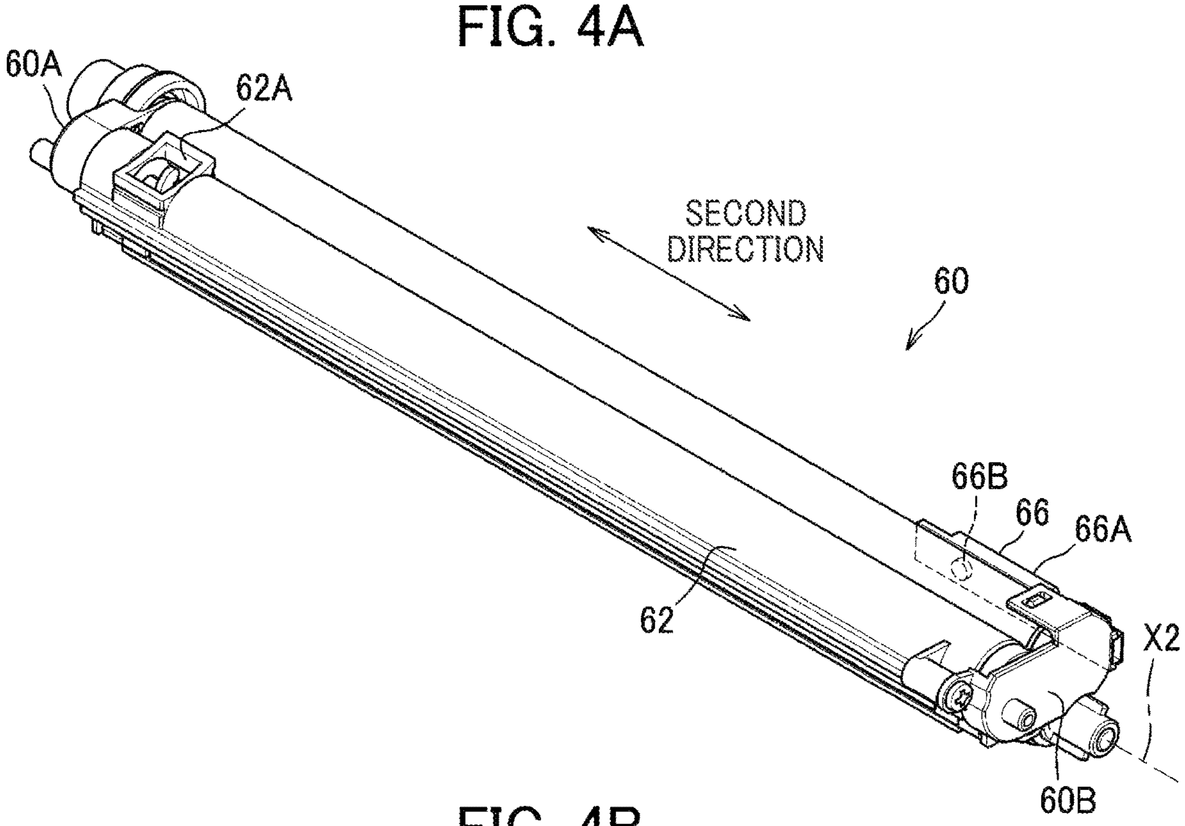
FIG. 4A is a perspective view of a developing unit.
Figure 4B:
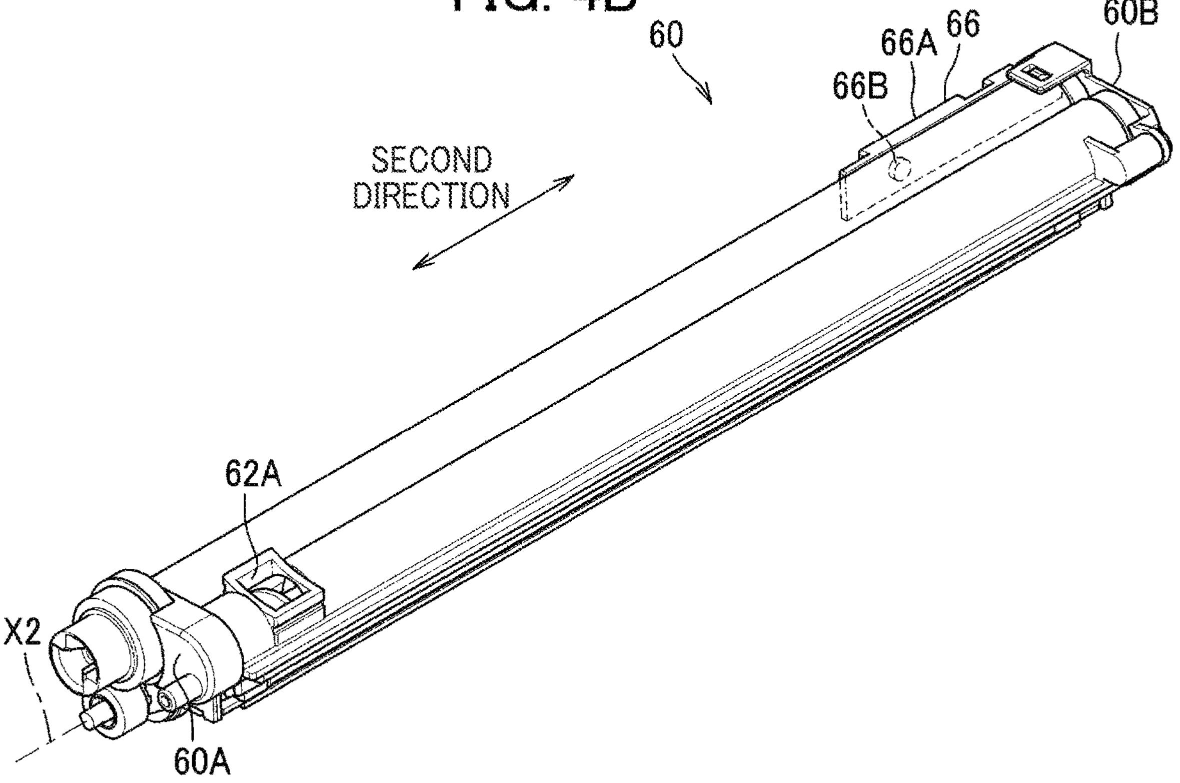
FIG. 4B is another perspective view of the developing unit.

As shown in FIGS. 4A and 4B, the supply port 62A is positioned at one end portion of the developing container 62 in the second direction.

As shown in FIG. 3, the first auger 63 and second auger 64 are positioned inside the developing container 62. The first auger 63 is rotatable about a third axis X3 extending in the second direction. The first auger 63 is configured to convey toner and carrier toward the magnetic roller 61. The second auger 64 is rotatable about a fourth axis X4 extending in the second direction. The first auger 63 is aligned with the second auger 64 in the first direction. The first auger 63 is positioned closer to the supply port 62A than the second auger 64 is to the supply port 62A.

The thickness-regulating blade 65 is a member that regulates the thickness of the toner layer on the magnetic roller 61. The thickness-regulating blade 65 does not contact the magnetic roller 61. The thickness-regulating blade 65 is positioned lower than the first auger 63 and second auger 64. Specifically, the thickness-regulating blade 65 is positioned below the first auger 63.

The thickness-regulating blade 65 is aligned with the magnetic roller 61 in the first direction. The second axis X2 is positioned between the thickness-regulating blade 65 and the first axis X1 in the first direction.

As shown in FIG. 1, the belt unit 70 is configured to transfer toner images from the photosensitive drums 51 onto sheets S. The belt unit 70 is positioned between the sheet-feeding section 20 and the drawer 50 in a state where the drawer 50 is mounted in the main casing 10. The belt unit 70 includes a drive roller 71, a follower roller 72, an intermediate transfer belt 73, four primary transfer rollers 74, and a secondary transfer roller 75.

The drive roller 71, follower roller 72, and primary transfer rollers 74 are positioned at the inner side of the intermediate transfer belt 73. The intermediate transfer belt 73 is pinched between the primary transfer rollers 74 and the corresponding photosensitive drums 51. The secondary transfer roller 75 is positioned at the outer side of the intermediate transfer belt 73. The intermediate transfer belt 73 is pinched between the secondary transfer roller 75 and the drive roller 71. Toner images on the photosensitive drums 51 are transferred onto the intermediate transfer belt 73. The secondary transfer roller 75 transfers the toner images from the intermediate transfer belt 73 to sheets S.

The fixing device 80 includes a heating roller 81, and a pressure roller 82. A sheet S is pinched between the pressure roller 82 and the heating roller 81.

The charging rollers 52 in the image-forming section 30 charge the surfaces of corresponding photosensitive drums 51. Subsequently, the scanning unit 40 exposes the surfaces of the photosensitive drums 51, thereby forming electrostatic latent images on the photosensitive drums 51.

The toner-accommodating sections 54 supply toner into the corresponding developing containers 62. The first augers 63 convey toner and carrier in the developing containers 62 to the corresponding second augers 64. The first augers 63 and second augers 64 circulate carrier within the developing containers 62 and convey toner toward the magnetic rollers 61. The magnetic rollers 61 supply the toner to electrostatic latent images on the photosensitive drums 51, thereby forming toner images on the photosensitive drums 51.

A sheet S passes between the drive roller 71 and the secondary transfer roller 75, at which time the toner images on the intermediate transfer belt 73 are transferred onto the sheet S. Subsequently, the sheet S passes between the heating roller 81 and the pressure roller 82, at which time the toner images on the sheet S are thermally fixed.

The discharging section 90 includes a plurality of conveying rollers 91. The conveying rollers 91 discharge sheets S to the outside of the main casing 10.

The controller 100 includes a CPU, RAM, ROM, and input/output circuits, for example. The controller 100 controls the color printer 1 by performing arithmetic processes based on information about the mounted cartridges and programs, data, or the like stored in ROM.

Figure 2B:
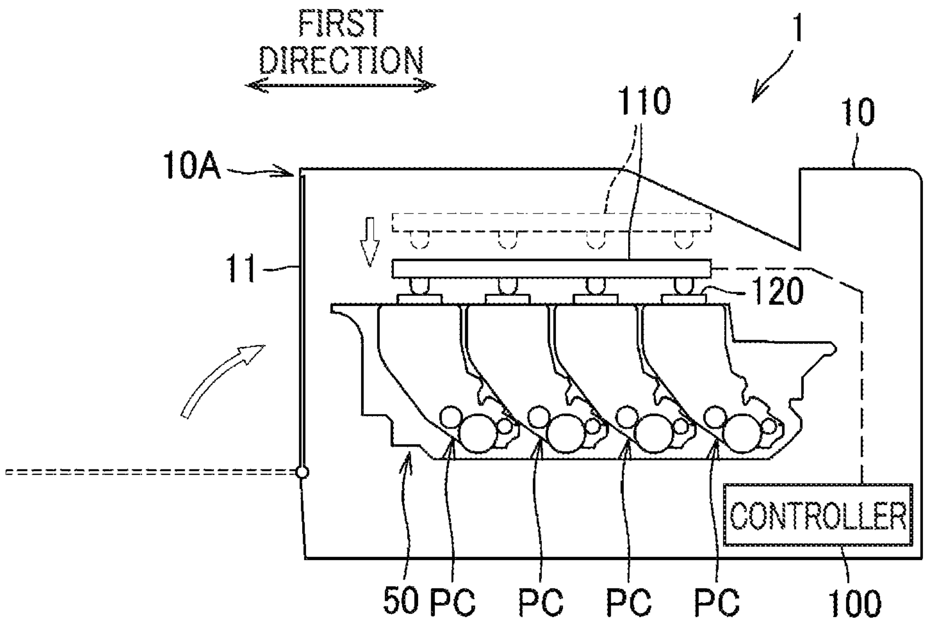
FIG. 2B is an explanatory view for explaining the positions of the device-side terminals when the cover is in a closed position.

As shown in FIGS. 2A and 2B, the color printer 1 includes device-side terminals 110. The device-side terminals 110 are positioned inside the main casing 10. The device-side terminals 110 are electrically connected to the controller 100. When the process cartridges PC are positioned in the main casing 10, the device-side terminals 110 can contact the corresponding process-side terminals 122.

Specifically, each device-side terminal 110 is movable between a contact position shown in FIG. 2B where the device-side terminal 110 contacts the corresponding process-side terminal 122, and a retracted position shown in FIG. 2A where the device-side terminal 110 does not contact the corresponding process-side terminal 122. When the cover 11 is in the open position, the device-side terminals 110 are in the retracted position, as shown in FIG. 2A. As shown in FIG. 2B, the device-side terminals 110 move from the retracted position to the contact position in conjunction with movement of the cover 11 from the open position to the closed position. Hence, when the user closes the cover 11, the device-side terminals 110 move downward and make contact with the corresponding process-side terminals 122, whereby the device-side terminals are electrically connected to the corresponding process-side terminals 122. A description of the mechanism interlocking the cover 11 and device-side terminals 110 has been omitted.

When the device-side terminals 110 contact the process-side terminals 122, the controller 100 can acquire process cartridge information from the process memories PM and can write information to the process memories PM.

As shown in FIGS. 4A and 4B, the developing unit 60 has the toner sensor 66. That is, each developing unit 60 has a corresponding toner sensor 66.

The toner sensor 66 is positioned at the opposite end portion of the developing container 62 from the supply port 62A in the second direction.

Figure 5:
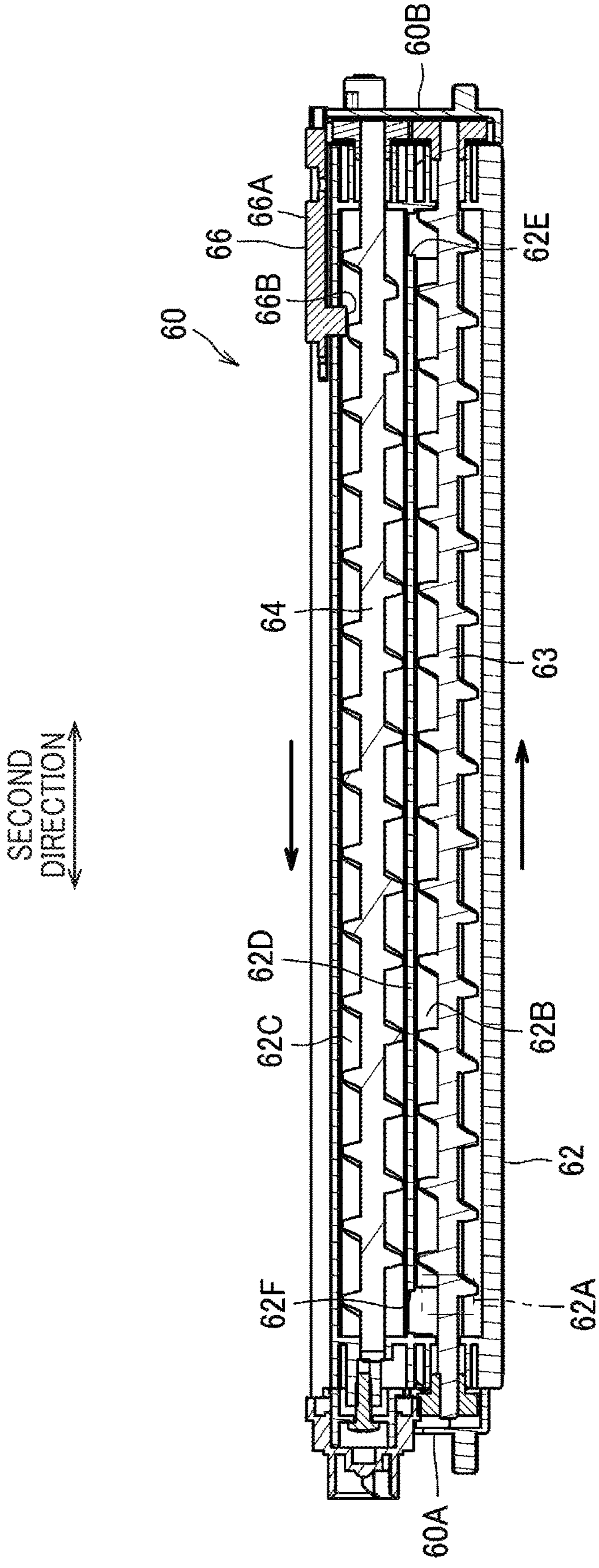
FIG. 5 is a cross-sectional view of the developing unit.

The toner sensor 66 is configured to output a detection signal (i.e., measurement signal) corresponding to the concentration of toner in the developing container 62. In the present embodiment, the toner sensor 66 is a magnetic sensor configured to measure magnetic permeability. The toner sensor 66 has a body part 66A, and a measuring part 66B. As shown in FIG. 5, the body part 66A is positioned outside the developing container 62. The measuring part 66B is inserted in a hole formed in the developing container 62 and contacts toner and carrier inside the developing container 62. The measuring part 66B has a disc shape. The measuring part 66B measures magnetic permeability. The detection signal outputted from the toner sensor 66 is transmitted to the controller 100. Thus, the controller 100 can determine the quantity of toner in the developing container 62 according to the detection signal transmitted from the toner sensor 66. In the present embodiment, the detection signal outputted from the toner sensor 66 is a voltage value. The voltage value outputted by the toner sensor 66 changes according to changes in the quantity of toner in the developing container 62.

When the device-side terminals 110 contact the process-side terminals 122 in a state where the process cartridges PC are positioned inside the main casing 10, the controller 100 can receive the detection signals outputted from the toner sensors 66.

The developing container 62 has a first compartment 62B, a second compartment 62C, a partitioning wall 62D, a supply opening 62E, and a return opening 62F. The first compartment 62B is a space for accommodating the first auger 63. The second compartment 62C is a space for accommodating the second auger 64. The first compartment 62B and second compartment 62C both contain toner and carrier.

The partitioning wall 62D is a wall separating the first compartment 62B from the second compartment 62C. The supply opening 62E is positioned at one end of the partitioning wall 62D in the second direction. The supply opening 62E connects the first compartment 62B to the second compartment 62C. The supply opening 62E allows toner and carrier to move from the first compartment 62B into the second compartment 62C.

The return opening 62F is positioned at the other end of the partitioning wall 62D in the second direction. The return opening 62F connects the first compartment 62B to the second compartment 62C. The return opening 62F allows toner and carrier to move from the second compartment 62C into the first compartment 62B.

The supply port 62A is connected to the first compartment 62B. The distance from the supply port 62A to the supply opening 62E is greater than the distance from the supply port 62A to the return opening 62F.

The first auger 63 is configured to convey toner and carrier from one end 60A toward another end 60B of the developing container 62 in the second direction. Specifically, the first auger 63 is configured to convey toner, which has been supplied into the first compartment 62B through the supply port 62A, to the supply opening 62E together with carrier.

The second auger 64 is configured to convey toner and carrier from the other end 60B toward the one end 60A of the developing container 62 in the second direction. Specifically, the second auger 64 is configured to convey toner, which has been supplied into the second compartment 62C through the supply opening 62E, toward the one end 60A in the second direction together with carrier. Toner conveyed in the second direction by the second auger 64 adheres to the surface of the magnetic roller 61 via the carrier owing to the magnetic force of the magnetic roller 61. Toner and carrier conveyed to the one end 60A of the developing container 62 by the second auger 64 moves into the first compartment 62B through the return opening 62F.

In this way, the first auger 63 and second auger 64 can convey toner and carrier from the supply port 62A toward the magnetic roller 61. The first auger 63 and second auger 64 also circulate the carrier and toner in the developing container 62.

Figure 6:
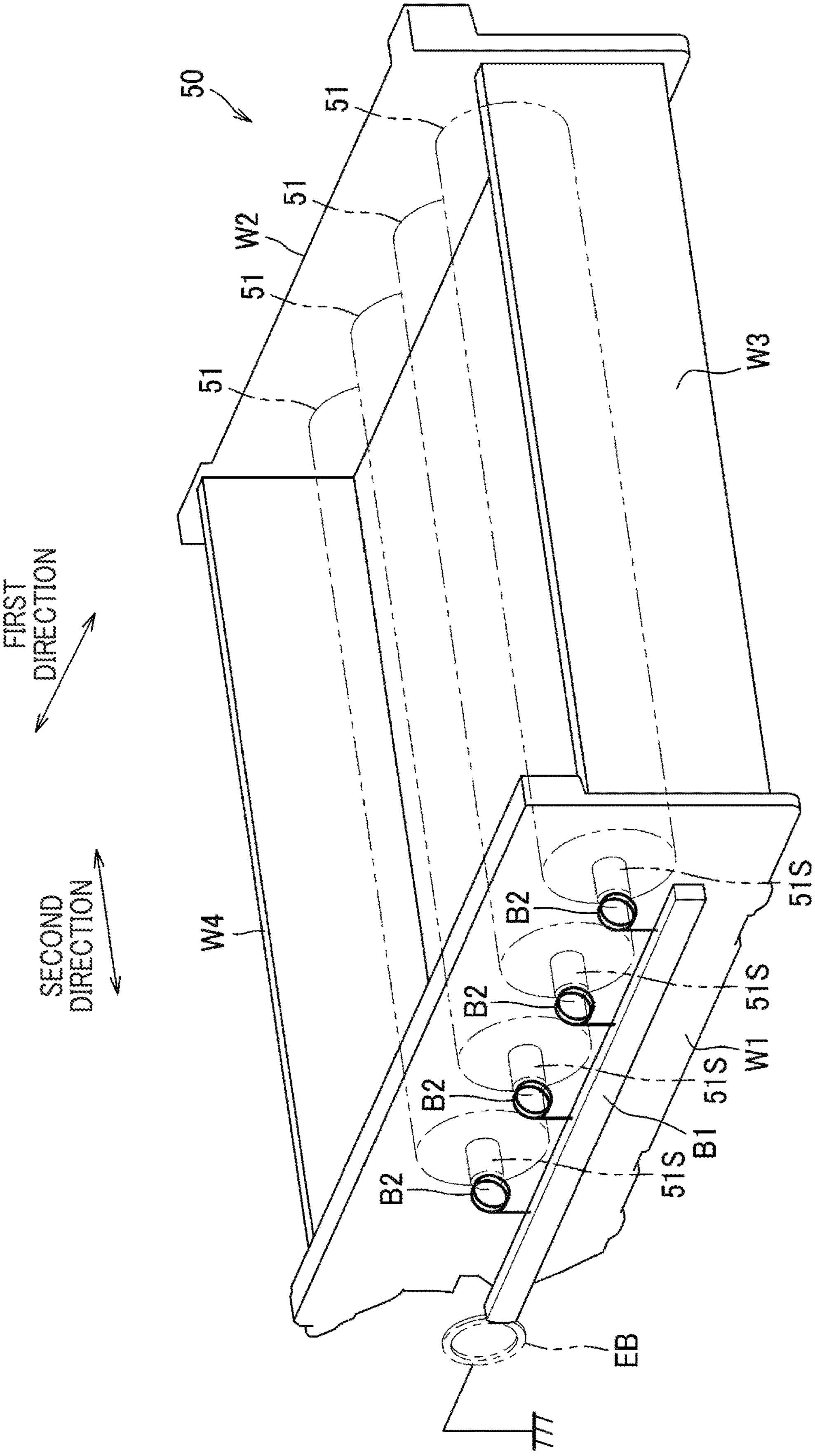
FIG. 6 is a perspective view of the drawer and specifically illustrates the arrangement of a sheet metal frame and ring springs.

As shown in FIG. 6, the drawer 50 includes a first side plate W1, a second side plate W2, a front plate W3, a rear plate W4, a sheet metal frame B1, and four ring springs B2.

The first side plate W1 and second side plate W2 are spaced apart in the second direction. The front plate W3 and rear plate W4 are spaced apart in the first direction. The front plate W3 is positioned on one end of the first side plate W1 and second side plate W2 in the first direction. The rear plate W4 is positioned on the other end of the first side plate W1 and second side plate W2 in the first direction.

The sheet metal frame B1 is positioned at the first side plate W1 and extends in the first direction. When the drawer 50 is mounted in the main casing 10, the sheet metal frame B1 contacts a device-side ground terminal EB of the main casing 10.

The four ring springs B2 are arranged in the first direction. Each of the four ring springs B2 is connected to the sheet metal frame B1. When the four process cartridges PC are attached to the drawer 50, the four photosensitive drums 51 are positioned between the first side plate W1 and the second side plate W2 in the second direction. When each process cartridge PC is attached to the drawer 50, an end of the shaft 51S in the photosensitive drum 51 of the process cartridge PC contacts the corresponding ring spring B2. As described above, the shaft 51S of the photosensitive drum 51 is electrically connected to the base tube 51A of the photosensitive drum 51. Accordingly, the base tube 51A of the photosensitive drum 51 is grounded via the shaft 51S, ring spring B2, and sheet metal frame B1. Note that the base tube 51A may be configured to be grounded through direct contact with the ring spring B2.

When the drawer 50 is mounted in the main casing 10 while the process cartridges PC are attached to the drawer 50, the controller 100 communicates with the components of each process cartridge PC to control the components of the drawer 50. Here, the electrical connections between the color printer 1 and the drawer 50 and the control executed by the controller 100 will be described with reference to FIG. 7.

Figure 7:
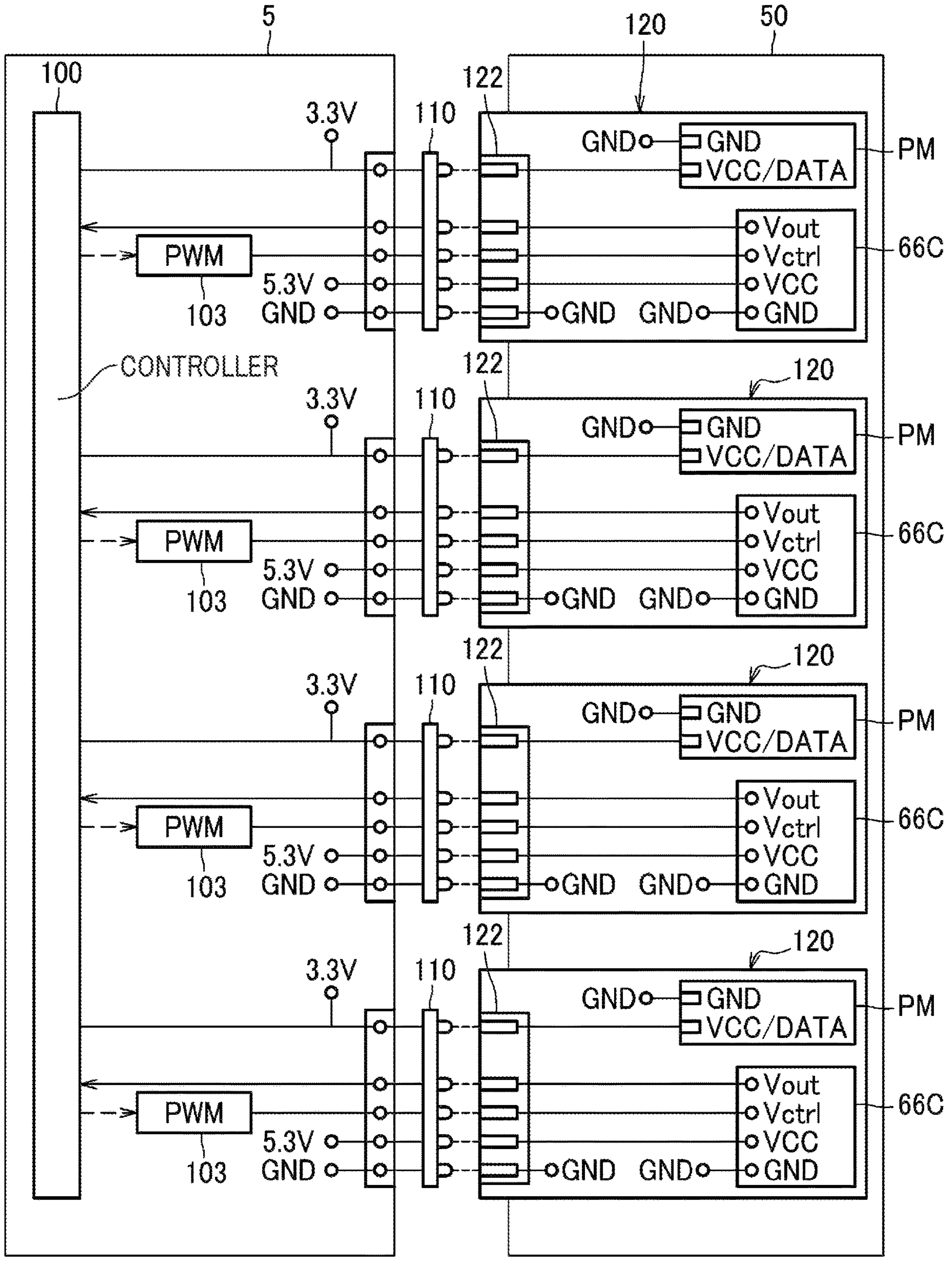
FIG. 7 is a circuit diagram for explaining connections between a controller, the device-side terminals, process-side terminals, process memories, and toner sensors in the color printer.

As shown in FIG. 7, the color printer 1 includes a main board 5. The main board 5 includes the controller 100 and control voltage generators 103. In the present embodiment, a plurality of control voltage generators 103 is provided for the plurality of toner sensors 66.

The controller 100 transforms a 24-V input voltage using a memory power supply voltage generator (not shown) on the main board 5 to 3.3 V, which is the voltage required to operate the process memories PM.

The controller 100 transforms the 24-V input voltage using a sensor power supply voltage generator (not shown) on the main board 5 to 5.3 V, which is the voltage required to operate the toner sensors 66.

Each control voltage generator 103 transforms the input voltage to generate a control voltage for controlling the detection signal (i.e., the measurement signal) of the corresponding toner sensor 66. In the present embodiment, each control voltage generator 103 is controlled by the controller 100 to transform the 24-V input voltage to generate a voltage suitable for the corresponding toner sensor 66. The voltage suitable for each toner sensor 66 in the present embodiment is a voltage that produces a large change in the voltage value outputted by the toner sensor 66 in response to a change in the quantity of toner. The control voltage generator 103 is a switching regulator, for example, that uses PWM control to produce a pulse voltage from an inputted DC voltage and that smooths this pulse voltage to generate a prescribed DC voltage.

Each of the device-side terminals 110 and process-side terminals 122 has five electrical contacts. The five electrical contacts of each device-side terminal 110 contact the corresponding five electrical contacts on the corresponding process-side terminal 122 when the drawer 50 is mounted in the main casing 10.

The five electrical contacts on each of the device-side terminals 110 and process-side terminals 122 are a VCC/DATA electrical contact for both transmitting the memory power supply voltage (3.3 V) and transmitting data stored in the process memory PM, a Vout electrical contact for transmitting the detection signal outputted from the toner sensor 66, a Vctrl electrical contact for transmitting the control voltage to the toner sensor 66, a VCC electrical contact for transmitting the sensor power supply voltage (5.3 V), and a GND electrical contact for grounding both the process memory PM and the toner sensor 66.

Each sensor connector 66C has four electrical contacts. The four electrical contacts of the sensor connector 66C are a Vout electrical contact for transmitting the detection signal outputted from the toner sensor 66, a Vctrl electrical contact for transmitting the control voltage to the toner sensor 66, a VCC electrical contact for transmitting the sensor power supply voltage (5.3 V), and a GND electrical contact for grounding the toner sensor 66.

Each process memory PM has two electrical contacts. The two electrical contacts of the process memory PM are a GND electrical contact for grounding the process memory PM, and a VCC/DATA electrical contact for both transmitting the memory power supply voltage (3.3 V) and transmitting data stored in the process memory PM.

Note that the GND electrical contact for grounding the toner sensor 66 and the GND electrical contact for grounding the process memory PM are electrically connected on each process board 120. Accordingly, the process-side terminal 122, which is configured to be connected to the device-side terminal 110, has only one GND electrical contact for grounding.

Each process memory PM also has a storage area for storing control voltage information for the toner sensor 66. The control voltage information is information for generating the control voltage. For example, the control voltage information in the present embodiment is a voltage value for controlling the detection signal of the toner sensor 66. The appropriate control voltage for the toner sensor 66 differs according to the types of toners being measured, such as different colors of toner. The appropriate control voltage also differs according to manufacture variation among the toner sensors 66. Although the toner sensor 66 may be capable of performing measurements even without the appropriate control voltage, the precision for measuring the quantity of toner in the developing container 62 is improved when measuring with the appropriate control voltage. In the present embodiment, the control voltage information (e.g., the appropriate control voltage) is measured at the time of manufacturing the process cartridge PC and is stored in the process memory PM in advance.

The controller 100 is configured to read the control voltage information for each toner sensor 66 from the corresponding process memory PM, control the corresponding control voltage generator 103 to generate the control voltage for the corresponding toner sensor 66 on the basis of this control voltage information, and supply the generated control voltage to the toner sensor 66.

The controller 100 is configured to receive the detection signal outputted from the toner sensor 66 and calculate the quantity of toner in the developing container 62 on the basis of the received detection signal.

The color printer 1 according to the embodiment described above can obtain the following effects.

In the color printer 1, the detection signals of the toner sensors 66 and information stored in the process memories PM that are outputted from the process cartridges PC attachable to and detachable from the drawer 50 can be outputted to the controller 100.

Since the device-side terminals 110 move from the retracted position to the contact position in conjunction with movement of the cover 11 from the open position to the closed position, the device-side terminals 110 contact the process-side terminals 122 when the user closes the cover 11. Therefore, the user does not need to perform any operation to connect the device-side terminals 110 to the process-side terminals 122. Further, since the controller 100 communicates with the process memories PM only when the cover 11 is in the closed position and does not communicate with process memories PM when the cover 11 is in the open position, there is no need to provide a separate sensor for detecting the opening and closing of the cover 11 or for the controller 100 to perform control according to detections by the sensor, for example. Further, since the device-side terminals 110 and process-side terminals 122 do not contact each other when the cover 11 is in the open position, failures of the process memories PM and toner sensors 66 can be suppressed.

Further, the controller 100 reads the control voltage information for each toner sensor 66 stored in the corresponding process memory PM and supplies the control voltage to the toner sensor 66 based on the read control voltage information. Therefore, a separate memory for storing the control voltage for the toner sensor 66 is not needed.

Next, a second embodiment will be described in detail with reference to FIG. 8. Here, only parts that differ from the first embodiment will be described, while a description of common parts will be omitted.

In the first embodiment, a single process board 120 is provided for each process cartridge PC. However, the second embodiment differs from the first embodiment in that two process boards are provided for each process cartridge PC.

Figure 8:
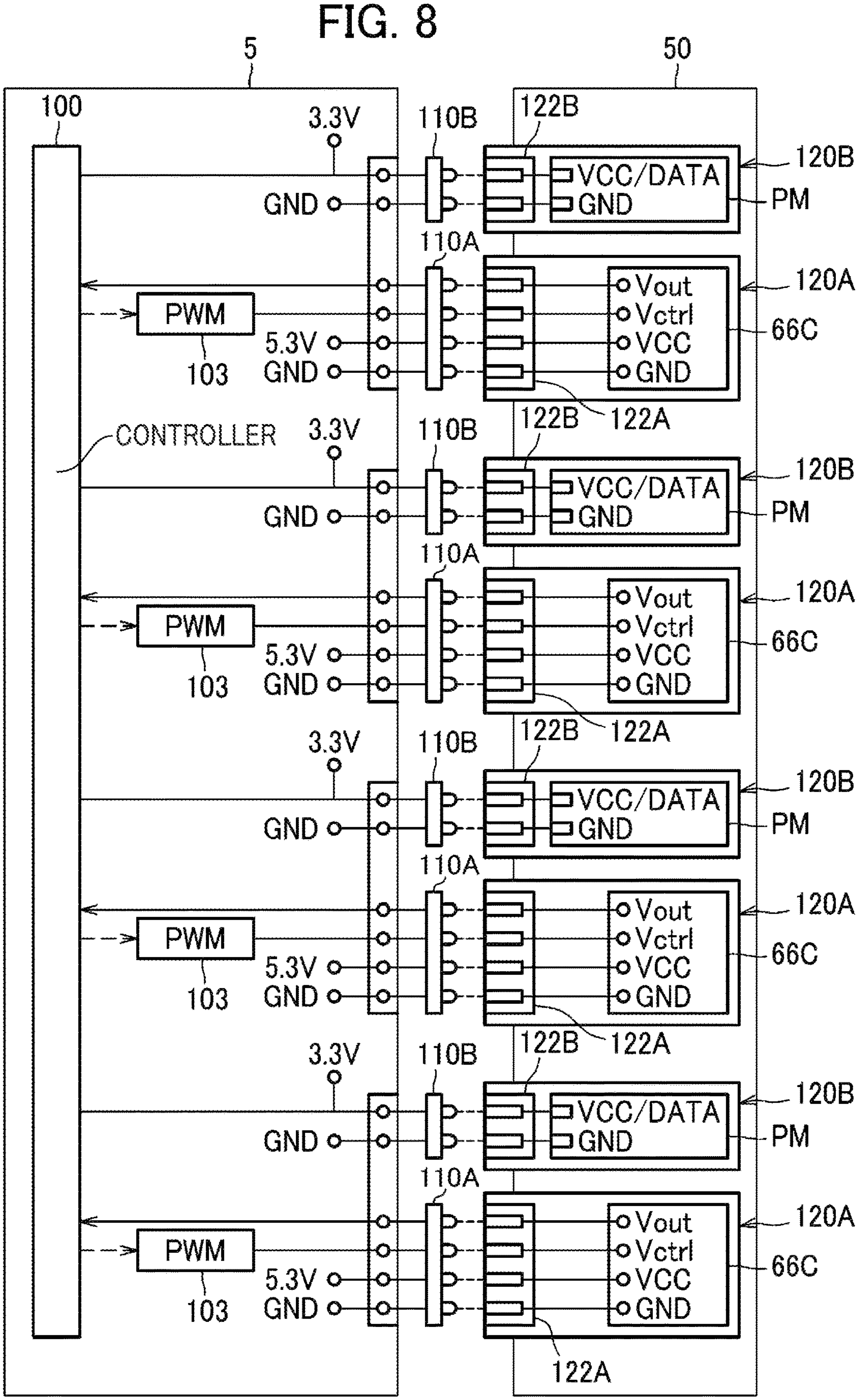
FIG. 8 is a circuit diagram for explaining connections between a controller, device-side terminals, process-side terminals, process memories, and toner sensors in another color printer.

As shown in FIG. 8, the process board of each process cartridge PC according to the second embodiment includes a first process board 120A and a second process board 120B. In other words, each process cartridge PC in the second embodiment includes a first process board 120A and a second process board 120B, in place of the process board 120. Each device-side terminal in the second embodiment includes a first device-side terminal 110A corresponding to the first process board 120A, and a second device-side terminal 110B corresponding to the second process board 120B. In other words, in place of the four device-side terminals 110, the color printer 1 according to the second embodiment includes four first device-side terminals 110A corresponding to the four first process boards 120A, and four second device-side terminals 110B corresponding to the four second process boards 120B.

Each first process board 120A includes the sensor connector 66C connected to the toner sensor 66, and a first process-side terminal 122A configured to output the detection signal of the toner sensor 66. The first process-side terminal 122A has four electrical contacts. The four electrical contacts of the first process-side terminal 122A are a Vout electrical contact for transmitting the detection signal outputted from the toner sensor 66, a Vctrl electrical contact for transmitting the control voltage to the toner sensor 66, a VCC electrical contact for transmitting the sensor power supply voltage (5.3 V), and a GND electrical contact for grounding the toner sensor 66. The first process-side terminal 122A is configured to contact the corresponding first device-side terminal 110A, which has four electrical contacts.

Each second process board 120B has the process memory PM, and a second process-side terminal 122B configured to output information stored in the process memory PM. The second process-side terminal 122B has two electrical contacts. The two electrical contacts of the second process-side terminal 122B are a GND electrical contact for grounding the process memory PM, and a VCC/DATA electrical contact for both transmitting the memory power supply voltage (3.3 V) and transmitting data stored in the process memory PM. The second process-side terminal 122B is configured to contact the corresponding second device-side terminal 110B, which has two electrical contacts.

According to the second embodiment described above, the first process board 120A and the second process board 120B can be arranged in separate locations, which increases design flexibility.

Next, a third embodiment will be described in detail with reference to FIG. 9. Here, only parts that differ from the first embodiment will be described, while a description of common parts will be omitted.

The third embodiment differs from the first embodiment in that the process cartridge PC includes process boards 220 in place of the process boards 120. Each process board 220 has an analog-to-digital converter circuit 225.

Figure 9:
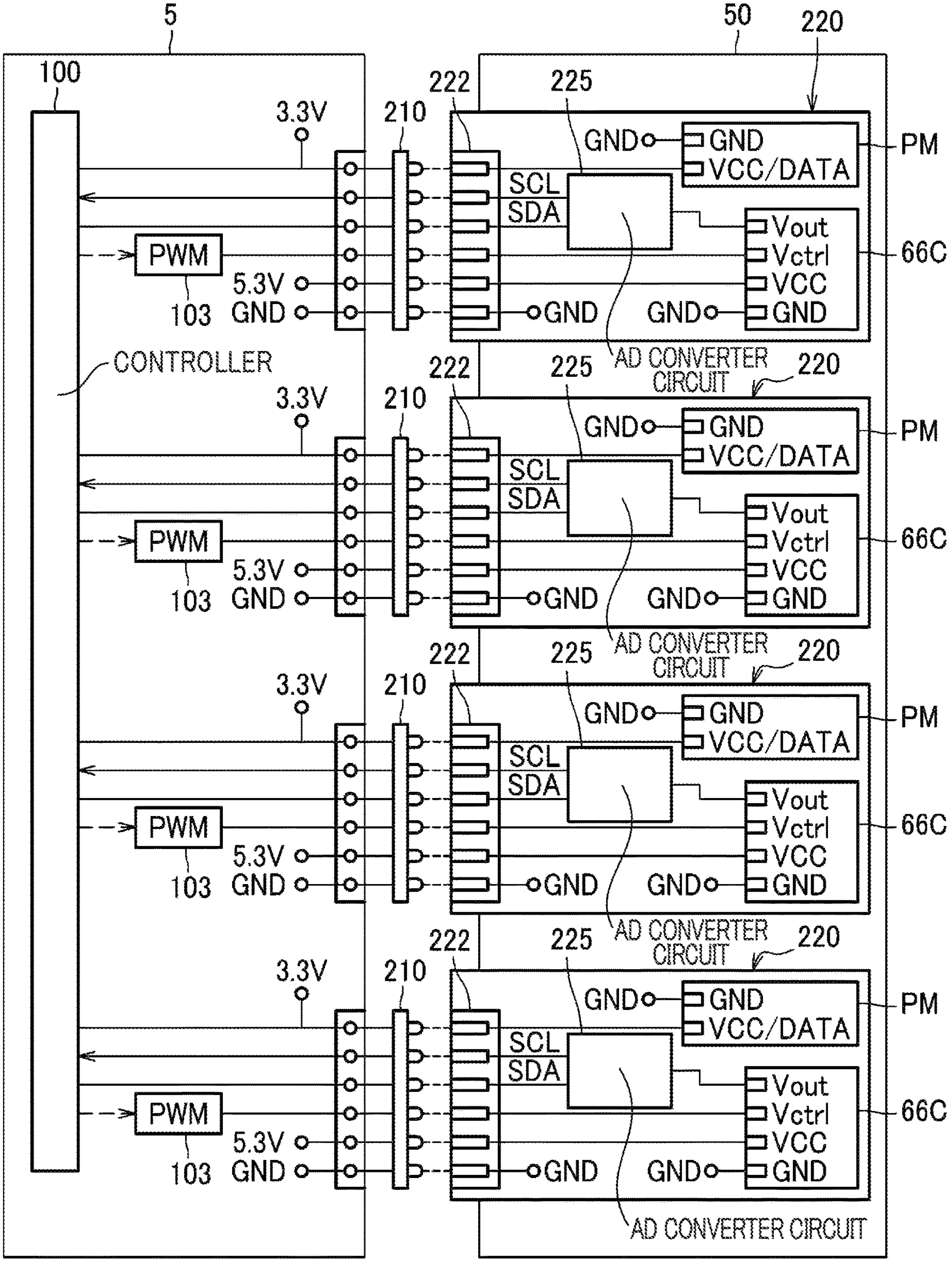
FIG. 9 is a circuit diagram for explaining connections between a controller, device-side terminals, process-side terminals, process memories, and toner sensors in another color printer.

As shown in FIG. 9, each process board 220 according to the third embodiment has the sensor connector 66C, the process memory PM, a process-side terminal 222, and the analog-to-digital converter circuit 225. The analog-to-digital converter circuit 225 is configured to convert the detection signal outputted from the toner sensor 66, which is an analog signal, into digital data. In the third embodiment, in place of the device-side terminals 110, the color printer 1 includes device-side terminals 210 corresponding to the process-side terminals 222.

Each of the device-side terminals 210 and process-side terminals 222 has six electrical contacts. The six electrical contacts of each of the device-side terminals 210 and process-side terminals 222 are a VCC/DATA electrical contact for both transmitting the memory power supply voltage (3.3 V) and transmitting data stored in the process memory PM, a SCL electrical contact for transmitting a clock signal to the analog-to-digital converter circuit 225, a SDA electrical contact for transmitting digital data from the analog-to-digital converter circuit 225 to the controller 100, a Vctrl electrical contact for transmitting the control voltage to the toner sensor 66, a VCC electrical contact for transmitting the sensor power supply voltage (5.3 V), and a GND electrical contact for grounding both the process memory PM and the toner sensor 66.

According to the third embodiment described above, the detection signal outputted from the toner sensor 66 is converted from an analog signal to digital data by the process board 220, thereby improving noise immunity to suppress a deterioration in data quality.

Next, a fourth embodiment will be described in detail with reference to FIG. 10. Here, only parts that differ from the first embodiment will be described, while a description of common parts will be omitted.

The fourth embodiment differs from the first embodiment in that the process cartridge PC includes process boards 320 in place of the process boards 120. each process board 320 has a drawer-side ground terminal B3 exclusively for grounding the process board 320.

Figure 10:
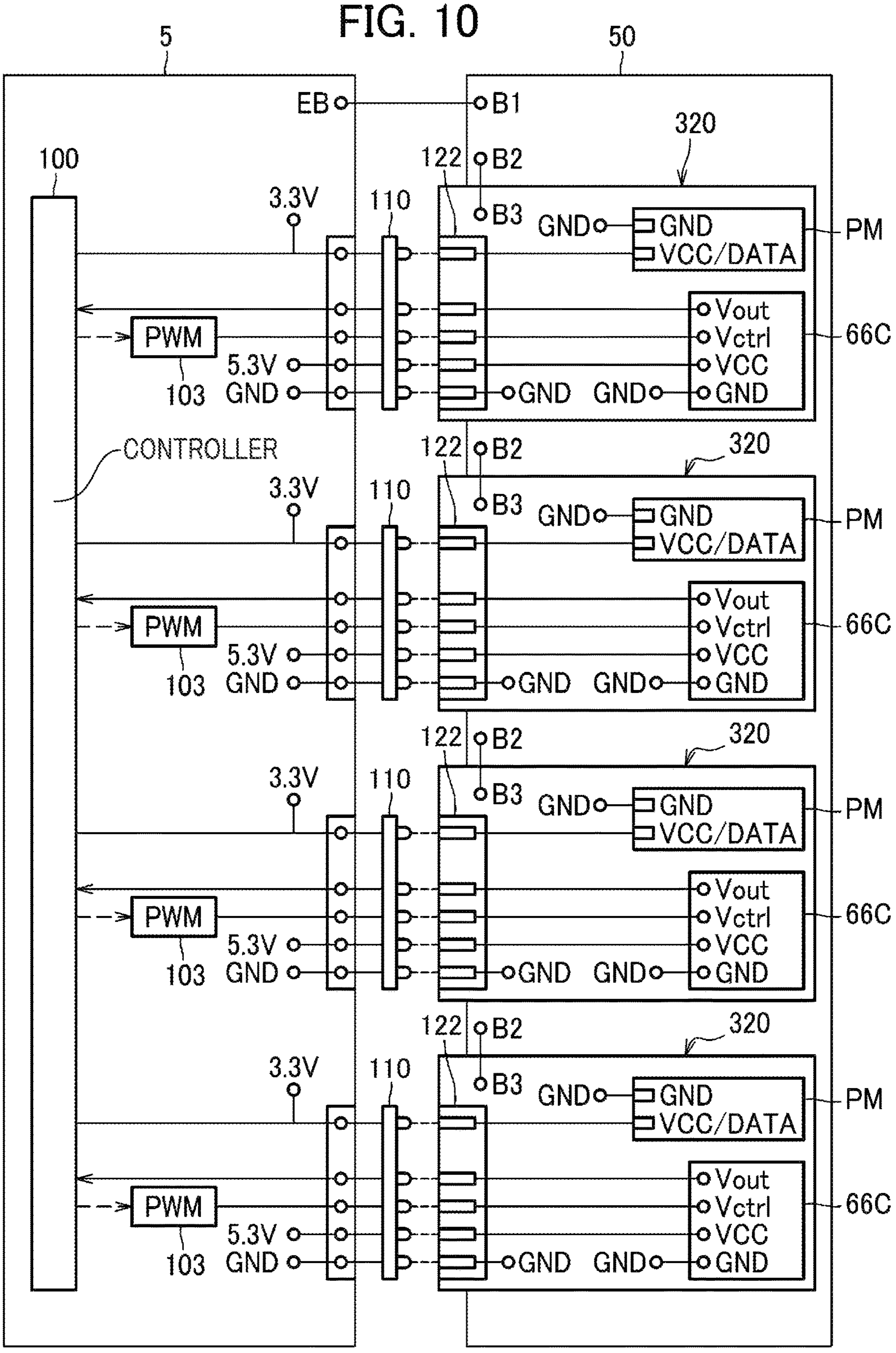
FIG. 10 is a circuit diagram for explaining connections between a controller, device-side terminals, process-side terminals, process memories, and toner sensors in another color printer.

As shown in FIG. 10, each process board 320 according to the fourth embodiment has the drawer-side ground terminal B3 dedicated to ground the process board 320. The drawer-side ground terminal B3 functions to ground the toner sensor 66 and the process memory PM.

The drawer-side ground terminal B3 is configured to be electrically connected to the corresponding ring spring B2 positioned at the first side plate W1 of the drawer 50 (see FIG. 6). As described above, the drawer 50 contacts the device-side ground terminal EB when the drawer is in the first position (see FIG. 6). In this way, the drawer-side ground terminal B3 is configured to be electrically connected to the device-side ground terminal EB, which is a separate terminal from the device-side terminal 110, and to ground both the toner sensor 66 and the process memory PM. Accordingly, the drawer-side ground terminal B3 is electrically connected to the base tube 51A of the photosensitive drum 51.

According to the fourth embodiment described above, the drawer-side ground terminals B3 can ground the toner sensors 66 and the process memories PM through different paths from the device-side terminals 110, thereby ensuring a more reliable ground. Since this reduces error between the ground potential of the main board 5 connected to the device-side ground terminal EB and the ground potential of the GND electrical contacts for grounding the toner sensors 66 which are connected to the drawer-side ground terminals B3, the controller 100 can obtain more accurate detection signals from the toner sensors 66.

Figure 11:
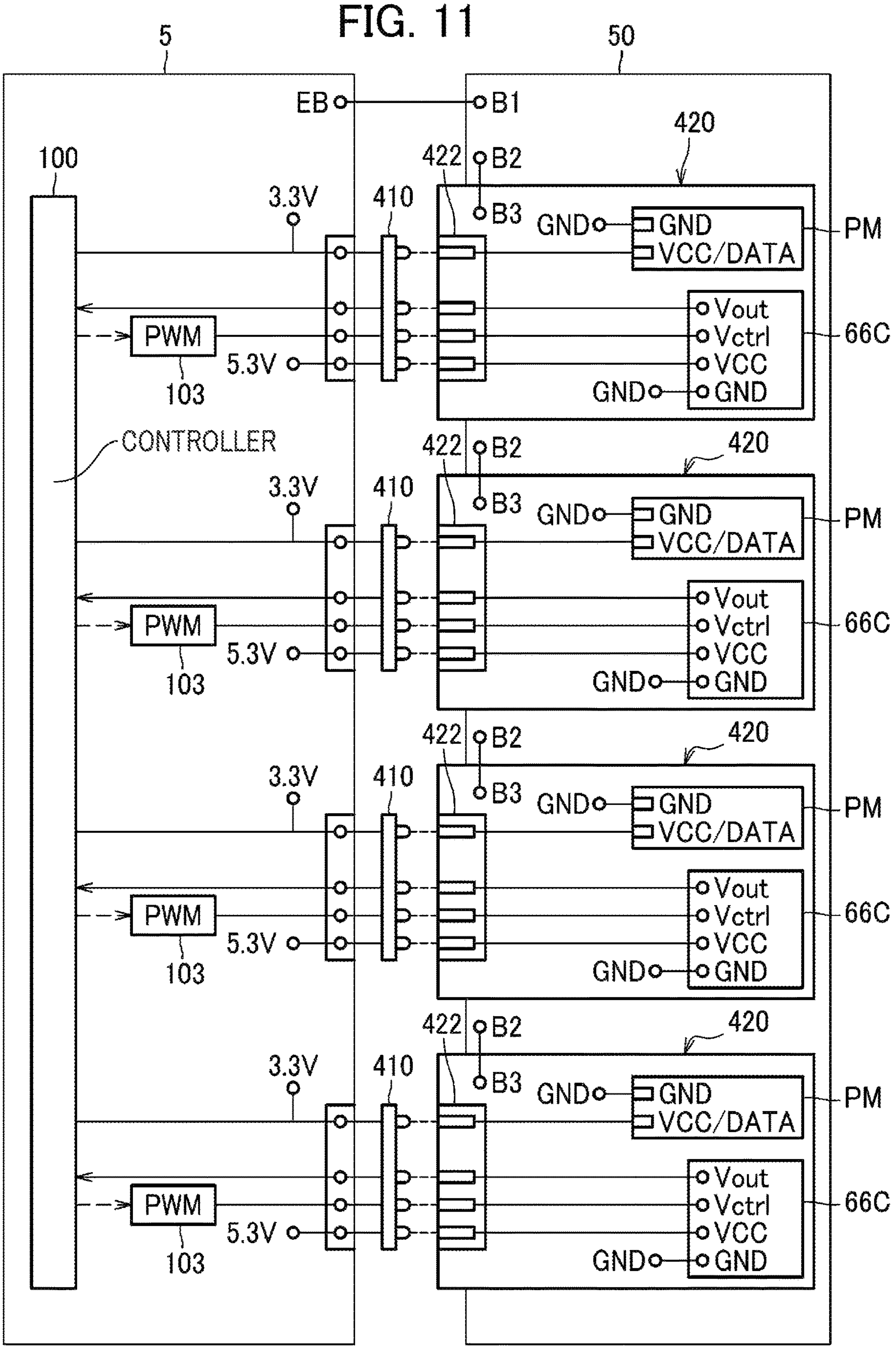
FIG. 11 is a circuit diagram for explaining connections between a controller, device-side terminals, process-side terminals, process memories, and toner sensors in another color printer.

Next, a fifth embodiment will be described in detail with reference to FIG. 11. Here, only parts that differ from the fourth embodiment will be described, while a description of common parts will be omitted.

The fifth embodiment differs from the fourth embodiment in that the process cartridge PC includes process boards 420 in place of the process boards 320 and in that the color printer 1 includes device-side terminals 410 in place of the device-side terminals 110. Each process board 420 has a process-side terminal 422. As shown in FIG. 11, unlike in the fourth embodiment, the device-side terminals 410 and process-side terminals 422 in the fifth embodiment do not have wiring used for grounding the toner sensors 66 and process memories PM.

Accordingly, since wiring for grounding the toner sensors 66 and process memories PM is not provided in the process-side terminals 422 and device-side terminals 410, the number of wires can be reduced.

Next, a sixth embodiment will be described in detail with reference to FIG. 12. Here, only parts that differ from the second embodiment will be described, while a description of common parts will be omitted.

The sixth embodiment differs from the second embodiment in the provision of a relay board that is a separate member from the main board 5.

Figure 12:
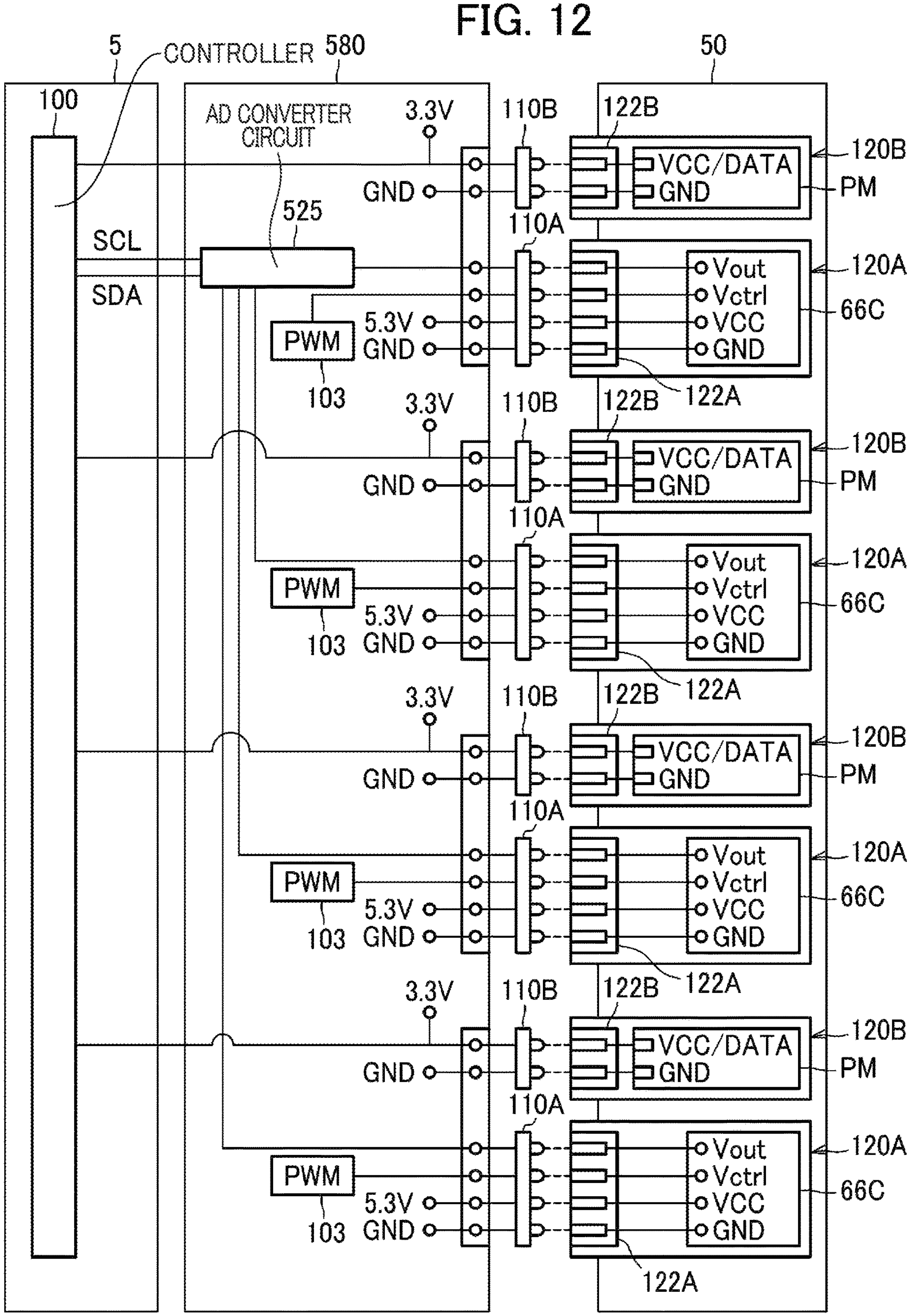
FIG. 12 is a circuit diagram for explaining connections between a controller, device-side terminals, process-side terminals, process memories, and toner sensors in another color printer.

As shown in FIG. 12, the sixth embodiment includes a relay board 580 that is positioned inside the main casing 10. The relay board 580 electrically connects each of the first device-side terminals 110A and second device-side terminals 110B to the controller 100. The relay board 580 is positioned in a different position from the main board 5. The relay board 580 has the four control voltage generators 103, and one analog-to-digital converter circuit 525.

The analog-to-digital converter circuit 525 is configured to convert the detection signals outputted from the toner sensors 66, which are analog signals, into digital data. The analog-to-digital converter circuit 525 is configured to convert the analog detection signal outputted from each of the four toner sensors 66 into digital data and to transmit the respective digital data to the controller 100 at different timings. Although the analog-to-digital converter circuit 525 is configured to transmit the respective digital data to the controller 100 at different timings, the analog-to-digital converter circuit 525 is not limited to this configuration. For example, the analog-to-digital converter circuit 525 may be configured to convert the respective digital data into data that allows for reversible conversion and transmit the converted digital data all at once to the controller 100.

According to the sixth embodiment described above, the first device-side terminals 110A and second device-side terminals 110B communicate with the controller 100 through wires combined on the relay board 580, thereby reducing the number of wires connected to the controller 100. Additionally, the analog detection signals from the four toner sensors 66 are converted by one analog-to-digital converter circuit 525, thereby suppressing an unnecessary increase in the number of analog-to-digital converter circuits 525. Further, the detection signals outputted from the toner sensors 66 are converted from analog signals to digital data by the relay board 580, thereby improving noise immunity to suppress a deterioration in data quality.

In the sixth embodiment described above, two process boards, i.e., the first process board 120A and second process board 120B are provided for each process cartridge PC, as in the second embodiment, but a configuration in which a single process board 120 is provided for each process cartridge PC may be employed, as in the first embodiment.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiments described above, the process cartridge includes a photosensitive drum, a charging roller, and a developing unit, but the process cartridge is not limited to this configuration. For example, the developing unit may be attachable to and detachable from a drum cartridge that includes the photosensitive drum and a charger. Additionally, the toner-accommodating section may be attachable to and detachable from the process cartridge, for example. In this case, in order to transmit a detection signal outputted from the toner sensor provided at the developing container to the process board, the toner-accommodating section may include a connector that can be electrically connected to the sensor connector when the toner-accommodating section is attached to the developing container.

While the toner sensor is provided at the developing container in the embodiments described above, the toner sensor may be provided at the toner-accommodating section instead. In this case, an opening may be formed in the developing container for inserting the detecting part of the toner sensor.

In the above embodiments, the process board 120 is positioned at the top surface of the process cartridge PC in a state where the process cartridge PC is attached to the drawer 50, but the position of the process board 120 is not limited to this. For example, the process board 120 may be positioned in a location other than the top surface in a state where the process cartridge PC is attached to the drawer 50.

In the above embodiments, the toner sensor is a magnetic sensor configured to measure magnetic permeability, but the toner sensor may be a physical sensor that measures the quantity of toner or the agitation torque. Also, the toner sensor may be an optical sensor that measures the amount of light transmitted through toner or the light reflectance of toner.

In the above embodiments, the control voltage information is information measured at the time of manufacturing the process cartridge PC and is stored in the process memory PM in advance, but the control voltage information is not limited to this. For example, when a new process cartridge PC containing a predetermined quantity of toner in the developing container 62 is attached to the color printer 1, the controller 100 may be configured to measure the quantity of toner with the toner sensor 66, set control voltage information such that the detection signal outputted from the toner sensor 66 indicates the predetermined quantity, and write this set control voltage information to the process memory PM. Since this configuration sets the control voltage information at the location where the color printer 1 is actually used, the control voltage information suited to the usage environment can be obtained, thereby improving the precision of the toner sensor 66.

In the above embodiments, the control voltage information for the toner sensor 66 is stored in the process memory PM, but the location of the control voltage information is not limited to this. For example, the main board 5 may include a memory in which control voltage information for the toner sensor 66 is stored. In this case, the control voltage information may be stored in the memory of the main board 5 at the time of manufacturing the color printer 1. As an alternative to this, the controller 100 may be configured to set control voltage information when a new process cartridge PC is attached to the color printer 1 and to write this set control voltage information to the memory of the main board 5.

In the above embodiments, the plurality of control voltage generators 103 is provided for the plurality of toner sensors 66, but a single control voltage generator 103 may be configured to generate control voltages for the plurality of toner sensors 66. In this case, the control voltage generator 103 may generate a control voltage suited to each toner sensor 66 and may provide these control voltages to the toner sensors 66 at different timings.

In the above embodiments, the process board 120 includes the sensor connector 66C connected to the toner sensor 66, but the connection is not limited to this configuration. For example, the harness of the toner sensor 66 may be connected to the process board 120 without a connector.

In the above embodiments, the memory power supply voltage is 3.3 V and the sensor power supply voltage is 5.3 V, but the voltages are not limited to these values. Further, the input voltage is 24 V in the above embodiments, but the input voltage is not limited to this value. Additionally, the voltage generators are not limited to a configuration that decreases voltage during transformation but may be configured to increase the voltage instead.

The detection signal outputted from the toner sensor 66 in the above embodiments is a voltage value, but the detection signal outputted from the toner sensor 66 may be an electric current value.

In the above embodiments, a voltage value is stored in the process memory PM as the control voltage information, but a duty cycle or the like for controlling the control voltage generator 103 may be stored instead.

In the above embodiments, the first auger 63 that conveys toner parallel to the rotational axis is described as an example of the conveying member, but the conveying member may be an agitator that conveys, with rotating fins, toner in a direction orthogonal to the rotational axis.

In the above embodiments, the present disclosure is applied to the color printer 1, but the present disclosure is not limited to a color printer and may be applied to other image-forming apparatuses, copiers, multifunction peripherals, and the like.

The elements described in the above embodiments and variations may be implemented in any combination.

What is claimed is:

1. An image-forming apparatus comprising:

a main casing;

a drawer movable in a first direction between a first position inside the main casing and a second position outside the main casing;

a plurality of process cartridges attachable to and detachable from the drawer, the plurality of process cartridges being arranged in the first direction in a state where the plurality of process cartridges are attached to the drawer, each of the plurality of process cartridges comprising:

a photosensitive drum;

a magnetic roller configured to supply toner to the photosensitive drum;

a developing container for storing therein carrier;

a conveying member positioned inside the developing container, the conveying member being configured to convey toner and carrier toward the magnetic roller;

a toner sensor configured to output a detection signal corresponding to a concentration of toner in the developing container;

a process memory for storing information about the process cartridge; and a process-side terminal for both outputting the detection signal of the toner sensor and outputting the information stored in the process memory;

a controller; and a device-side terminal positioned inside the main casing, the device-side terminal being connected to the controller, the device-side terminal being configured to contact the process-side terminal, wherein the main casing has an opening through which the drawer is movable between the first position and the second position, wherein the image-forming apparatus further comprises a cover movable between an open position where the cover opens the opening and a closed position where the cover closes the opening, wherein the device-side terminal is movable between a contact position where the device-side terminal contacts the process-side terminal and a retracted position where the device-side terminal does not contact the process-side terminal, wherein the device-side terminal is in the retracted position when the cover is in the open position, and wherein the device-side terminal moves from the retracted position to the contact position in conjunction with movement of the cover from the open position to the closed position.

2. The image-forming apparatus according to claim 1, wherein each of the plurality of process cartridges further comprises a process board including:

a sensor connector connected to the toner sensor;

the process memory; and the process-side terminal.

3. The image-forming apparatus according to claim 2, wherein the process-side terminal comprises:

a first process-side terminal configured to output the detection signal of the toner sensor; and a second process-side terminal configured to output the information stored in the process memory, and wherein the process board comprises:

a first process board including the sensor connector and the first process-side terminal; and a second process board including the process memory and the second process-side terminal.

4. The image-forming apparatus according to claim 2, wherein the process board is positioned at a top surface of the process cartridge in a state where the process cartridge is attached to the drawer.

5. The image-forming apparatus according to claim 2, wherein the detection signal outputted from the toner sensor is an analog signal, and wherein the process board further includes an analog-to-digital converter circuit configured to convert the detection signal into digital data.

6. The image-forming apparatus according to claim 2, further comprising:

a device-side ground terminal that is a separate member from the device-side terminal, wherein the process board further includes a drawer-side ground terminal configured to, when the drawer is in the first position, contact the device-side ground terminal to ground both the toner sensor and the process memory.

7. The image-forming apparatus according to claim 6, wherein the device-side terminal and the process-side terminal include neither wiring used for grounding the toner sensor nor wiring used for grounding the process memory.

8. The image-forming apparatus according to claim 6, wherein the photosensitive drum includes:

a base tube; and a photosensitive layer formed on an outer circumferential surface of the base tube, and wherein the drawer-side ground terminal is electrically connected to the base tube.

9. The image-forming apparatus according to claim 1, wherein the device-side terminal includes a plurality of device-side terminals, and wherein the image-forming apparatus further comprises a relay board positioned inside the main casing, the relay board electrically connecting each of the plurality of device-side terminals to the controller.

10. The image-forming apparatus according to claim 1, further comprising:

a control voltage generator configured to transform an input voltage to generate a control voltage used for controlling the detection signal of the toner sensor, wherein the process memory has a storage area for storing control voltage information used for generating the control voltage, and wherein the controller is configured to:

read the control voltage information from the process memory; and control the control voltage generator to generate the control voltage and to supply the generated control voltage to the toner sensor.

11. The image-forming apparatus according to claim 1, wherein the toner sensor is a magnetic sensor configured to measure magnetic permeability.

12. The image-forming apparatus according to claim 1, wherein the controller is configured to:

receive the detection signal outputted from the toner sensor; and calculate an amount of toner in the developing container on the basis of the received detection signal.

13. The image-forming apparatus according to claim 1, further comprising:

an intermediate transfer belt onto which a toner image on the photosensitive drum is transferred; and a secondary transfer roller configured to transfer the toner image transferred on the intermediate transfer belt onto a sheet.

14. The image-forming apparatus according to claim 1, further comprising:

a cleaning blade configured to contact the photosensitive drum to clean a surface of the photosensitive drum.

15. The image-forming apparatus according to claim 1, further comprising:

a charging roller configured to charge a surface of the photosensitive drum.

16. An image-forming apparatus comprising:

a main casing;

a drawer movable in a first direction between a first position inside the main casing and a second position outside the main casing;

a plurality of process cartridges attachable to and detachable from the drawer, the plurality of process cartridges being arranged in the first direction in a state where the plurality of process cartridges are attached to the drawer, each of the plurality of process cartridges comprising:

a photosensitive drum;

a magnetic roller configured to supply toner to the photosensitive drum;

a developing container for storing therein carrier;

a conveying member positioned inside the developing container, the conveying member being configured to convey toner and carrier toward the magnetic roller;

a toner sensor configured to output a detection signal corresponding to a concentration of toner in the developing container;

a process memory for storing information about the process cartridge; and a process-side terminal for both outputting the detection signal of the toner sensor and outputting the information stored in the process memory;

a controller; and a device-side terminal positioned inside the main casing, the device-side terminal being connected to the controller, the device-side terminal being configured to contact the process-side terminal, wherein each of the plurality of process cartridges further comprises a process board including:

a sensor connector connected to the toner sensor;

the process memory; and the process-side terminal, wherein the process-side terminal comprises:

a first process-side terminal configured to output the detection signal of the toner sensor; and a second process-side terminal configured to output the information stored in the process memory, and wherein the process board comprises:

a first process board including the sensor connector and the first process-side terminal; and a second process board including the process memory and the second process-side terminal.

* * * * *